United States Patent [19]

Feinauer et al.

[11] Patent Number: 4,690,970
[45] Date of Patent: Sep. 1, 1987

[54] THERMOPLASTIC COMPOSITIONS BASED ON POLYPHENYLENE ETHERS, IMPACT-RESISTANT STYRENE POLYMERS, AND PULVERULENT, FILLER-CONTAINING RUBBER; AND METHOD FOR MANUFACTURING SUCH COMPOSITIONS

[75] Inventors: Roland Feinauer; Hans Jadamus, both of Marl, Fed. Rep. of Germany

[73] Assignee: Chemische Werke Huels Aktiengesellschaft, Marl, Fed. Rep. of Germany

[21] Appl. No.: 746,040

[22] Filed: Jun. 18, 1985

[30] Foreign Application Priority Data

Jun. 30, 1984 [DE] Fed. Rep. of Germany ....... 3424219

[51] Int. Cl.$^4$ ............................. C08K 3/36; C08K 3/04
[52] U.S. Cl. ..................... 524/504; 524/505; 524/508
[58] Field of Search ................ 524/504, 505, 508, 525

[56] References Cited

U.S. PATENT DOCUMENTS

| | | | |
|---|---|---|---|
| 3,383,435 | 5/1968 | Cizek | 525/132 |
| 3,787,532 | 1/1974 | Carmelite et al. | 524/508 |
| 3,833,687 | 9/1974 | Lee | 524/504 |
| 3,835,200 | 9/1974 | Lee | 524/504 |
| 3,887,647 | 6/1975 | Yonemitsu et al. | 524/504 |
| 4,128,602 | 12/1978 | Katchman et al. | 525/132 |
| 4,250,082 | 2/1981 | Sommer et al. | 524/571 |
| 4,301,059 | 11/1981 | Cooper et al. | 524/504 |
| 4,373,055 | 2/1983 | Haaf et al. | 524/505 |
| 4,480,057 | 10/1984 | Sano | 524/508 |
| 4,483,958 | 11/1984 | Kosaka et al. | 524/504 |
| 4,525,508 | 6/1985 | Lee | 524/504 |

FOREIGN PATENT DOCUMENTS

| | | |
|---|---|---|
| 3246443 | 6/1983 | Fed. Rep. of Germany . |
| 2426061 | 12/1979 | France . |
| 7485144 | 8/1974 | Japan . |
| 168938 | 12/1981 | Japan . |
| 1344093 | 1/1974 | United Kingdom . |

OTHER PUBLICATIONS

Chemical Abstracts, Band 82, 1975, Seite 35, Nr. 73928m, Columbus, Ohio, US.

*Primary Examiner*—Lewis T. Jacobs
*Attorney, Agent, or Firm*—Oblon, Fisher, Spivak, McClelland, & Maier

[57] ABSTRACT

The invention relates to thermoplastic molding compositions comprised of polyphenylene ethers, impact-resistant styrene polymers, and a pulverulent, filler-containing rubber; and further comprised of various additives. The present invention also relates to a method(s) for preparing such compositions. Preferably the pulverulent, filler-containing rubber is prepared from an E-SBR rubber (emulsion polymerized SBR rubber) produced according to German Pat. No. 2,822,148.

19 Claims, 1 Drawing Figure

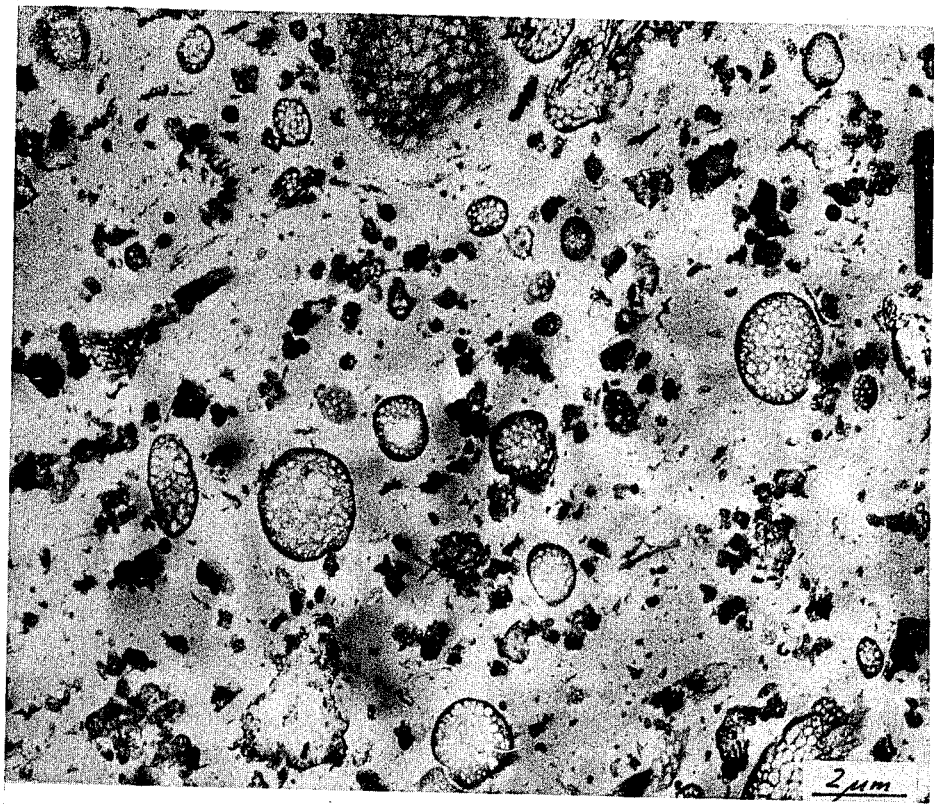

THERMOPLASTIC COMPOSITIONS BASED ON POLYPHENYLENE ETHERS, IMPACT-RESISTANT STYRENE POLYMERS, AND PULVERULENT, FILLER-CONTAINING RUBBER; AND METHOD FOR MANUFACTURING SUCH COMPOSITIONS

BACKGROUND OF THE INVENTION

1. Field of the Invention

This invention relates to thermoplastic compositions based on polyphenylene ethers, impact resistant styrene polymers, and pulverulent, filler-containing rubber. This invention also relates to a method for the manufacture of these compositions.

2. Description of the Prior Art

Thermoplastic compositions suitable for the production of molded parts and comprised of modified styrene polymers and polyphenylene ethers (PPE) were first described in German Patent No. 1,694,257. German Patent No. 2,211,005 discloses that preferably, the fraction of the finely distributed elastomeric gel phase in the rubber-modified polystyrene should be greater than 22 wt. %.

The thermoplastic compositions disclosed in German Patent No. 2,119,301 are comprised of polyphenylene ethers with a rubber-modified polystyrene and/or a polystyrene and a rubber.

For compositions in which the mean particle diameter of the dispersed elastomeric phase is less than a maximum value of about 2 microns, higher impact resistances are said to be attainable.

The molding compositions based on polyphenylene ethers and polybutadiene, described in German Patent No. 1,694,255, are of lesser industrial importance. The reason for this may be that the two components are not infinitely miscible, in contrast to the case in which polystyrene is used.

It is known to add fillers, e.g. metals, titanium dioxide, asbestos, glass fibers, calcium silicate, or aluminum silicate (DE-OSS Nos. 27 13 462, 27 52 383, and 28 40 111) to polymer mixtures in order to improve their physical properties. By the addition of aluminum flake, carbon fibers, and carbon black, an electrical shield effect can be attained in the molded items produced from these polymer mixtures.

The filler-containing thermoplastic masses are produced by thoroughly mixing the components, namely, the polyphenylene ether, the styrene resin, and the filler, extruding the molten premixture to form a cord, and comminuting the latter to form a granulate (see DE-OS No. 27 13 462). Among the polymer mixtures based on polyphenylene ethers those with high impact strength and high distortion temperature are especially important.

In principle, mixtures based on polyphenylene ethers and impact-resistant styrene polymers (also called "high impact styrene polymers" ("HISP")) may be produced with various contents of rubber. However, this approach is costly because a large number of different types of polystyrene must be kept available so that adjustments can be made to achieve desired qualities in each given case. It would be simpler if various types of products could be produced by appropriate mixing of just a few starting components.

One possible approach is to start with an impact-resistant styrene polymer having a high percentage of rubber mixed or incorporated therein, and then to thin this material to the degree desired with polystyrene.

It would be still more advantageous if one could start with an impact-resistant styrene polymer with low rubber content, since this is not only more readily available but also much less expensive.

It is technically possible to produce polystyrene and then to incorporate (e.g., mix) the rubber into the polystyrene in a subsequent operation. But the rubber, which is ordinarily employed in the form of bales is difficult to handle. Moreover, for a given content of rubber, molded parts produced from such polymer mixtures have a lower measured impact resistance than is attained by impact-resistant styrene polymers (see German Patent No. 2,119,301, col. 2 lines 51 ff.). Thus the purpose of adding the rubber is defeated.

Accordingly, there is a strong need for a method permitting the advantageous addition of rubber, in pulverulent form and containing various amounts of fillers, to the subject synthetic plastic base compositions.

No examples of this are known from the literature, i.e., no examples of practicable compositions produced by addition of such rubber mixtures to polyphenylene ethers and impact-resistant styrene polymers are known. All that is known is that pulverulent, filler-containing rubbers which contain certain percentages of thermoplastics (such as polyvinyl chloride, polystyrene, or polymethyl methacrylate), may be prepared. See German Patent No. 1,694,918. However, this patent publication does not give one skilled in the art any encouragement, stimulus, or clue as to the preparation of compositions of this type which are in fact practicable—a fortiori since the method described there has been a commercial failure.

Research conducted by the present Applicants has in fact shown that natural-rubber-based rubber compositions based on mixtures with polyphenylene ethers and impact-resistant styrene polymers lead to molding compounds with sharply reduced impact resistance (see Comparison Examples B and C, infra). Unsatisfactory results were also obtained with polybutadiene-based rubbers in pulverulent form. In view of these results it appeared unpromising to attempt to develop polymer compositions comprised of polyphenylene ethers, styrene resins and pulverulent, filler-containing rubber. Accordingly the strong need for a method permitting the advantageous addition of rubber, in pulverulent form and containing various amounts of fillers, to the subject synthetic plastic base composition remained.

SUMMARY OF THE INVENTION

It is an object of the present invention to provide polymer composition based on polyphenylene ethers, impact-resistant styrene polymers and fillers.

It is another object of the present invention to provide polymer compositions based on polyphenylene ethers, impact-resistant styrene polymers, and fillers, where these compositions have high heat distortion temperature It is another ojbect of the present invention to provide polymer compositions based on polyphenylene ethers, impact-resistant styrene polymers, and fillers, where these compositions have adjustable impact resistance.

It is another object of this invention to provide a method for preparing these polymer compositions having a high heat distortion temperature and adjustable impact resistance.

Applicants have discovered that it is possible to produce polymer compositions comprised of polyphenylene ethers, impact-resistant styrene polymers, and pulverulent, filler containing SBR rubbers.

The present invention provides a thermoplastic molding composition comprised of mixtures of polyphenylene ether, impact-resistant styrene polymers, filler materials and other additives. These compositions are characterized by the fact that the mixtures are comprised of polyphenylene ethers, impact-resistant styrene polymers, and a pulverulent, filler-containing SBR rubber.

The present invention also provides a method for preparing these compositions by thoroughly mixing the components and remelting them in a kneader-mixer.

BRIEF DESCRIPTION OF THE FIGURE

A more complete appreciation of the invention and many attendant advantages thereof will be readily obtained as the same becomes better understood by reference to the following detailed description when considered in connection with the accompanying figure; wherein FIG. 1 is a transmission electron micrograph (4.900×) of a thin layer (thickness=50 nm) of a composition prepared in accordance to example 5 (see Table infra).

DESCRIPTION OF THE PREFERRED EMBODIMENTS

Experiments showed that, e.g., when carbon black was incorporated into the composition it was not distributed diffusely into the interior of the mass of the polystyrene phase. Rather, it appeared to cause formation of a separate phase of rubber particles with high carbon black content, in addition to the polystyrene phase and the finely distributed elastomer phase within the polystyrene phase (see FIG. 1). This was surprising, and furnished a reason for the astonishingly high heat distortion temperature shown by the resulting molded pieces at various given levels of impact-resistance.

The present invention provides a thermoplastic molding composition comprised of mixtures of polyphenylene ether, impact-resistant styrene polymers, filler materials and other additives. These compositions are characterized by the fact that the mixtures are comprised of polyphenylene ethers, impact-resistant styrene polymers, and a pulverulent, filler-containing SBR rubber.

The thermoplastic composition of the present invention may be further characterized in that the pulverulent, filler-containing rubber is prepared as follows:

(a) The rubber components in dissolved form are combined with an aqueous suspension of fillers. The aqueous suspension comprises a water-soluble aluminum salt and water glass and has a pH of 3.0 to 3.7.

(b) In the course of this combination step, mineral acid is added as needed to maintain the pH of the resulting mixture continuously at a pH of from 3.0 to 3.7.

The thermoplastic composition of the present invention may also be further characterized in that the pulverulent, filler-containing rubber is based on an E-SBR rubber (emulsion polymerized SBR rubber).

The thermoplastic composition of the present invention may also be further characterized in that the pulverulent, filler-containing SBR rubber is present in the thermoplastic compositions in the amount of 0.5 to 50 wt. % preferably 5 to 10 wt%.

The thermoplastic of the present invention may also be further characterized in that the rubber component of the pulverulent, filler-containing SBR rubber is comprised of from 15 to 40 wt. %, and preferably 20 to 25 wt. %, of polymerized styrene units. The remainder of the rubber component being comprised of polymerized butadiene units.

The thermoplastic composition of the present invention may also be further characterized in that the filler material used with the pulverulent SBR rubber comprises carbon black.

The thermoplastic composition of the present invention may also be further characterized in that the filler material used with the pulverulent SBR rubber comprises silicic acid.

The filler material content of the pulverulent, filler-containing SBR rubber employed may be between 10 and 80 wt. %, preferably between 30 and 60 wt. %.

The thermoplastic composition of the present invention may also be further characterized in that the content of rubber in the impact-resistant styrene polymer is between 5 and 10 wt. %.

The thermoplastic composition of the present invention may also be further characterized in that the diameter of the particles in the elastomeric gel phase of the impact-resistant styrene polymers employed is less than 10 micron, preferably less than 3.5 micron.

The volumetric mean diameter of the particles having diameters between 0.5 micron and 10 micron may be in the range between 1 and 5 micron.

The thermoplastic composition of the present invention may also be further characterized in that up to 50 wt. % of the composition comprises reinforcing materials, and up to 15 wt. % of the composition comprises a fire retardant agent (on the basis of the total weight of the molding composition).

In this embodiment, the composition may also be further characterized in that up to 5 wt. % of the composition is comprised of additional additives (on the basis of the total weight of the molding composition.)

In the present invention also provides a method for preparing the thermoplastic composition. This method is characterized in that the components are mixed thoroughly and are remelted in a kneader-mixer.

The method for preparing the thermoplastic composition of the present invention may also be further characterized in that the pulverulent, filler-containing rubber and the various additives are mixed into a melt comprised of polyphenylene ethers and impact-resistant styrene polymers, at 200° to 300° C.

The following advantages with the present invention have been established:

1. Polymer formulations have been prepared which lead to molding compounds having prescribed hot shape stability and impact-resistance. This is achieved solely by adjustment of the ratio of the polyphenylene ethers, the impact-resistant styrene polymers, and the pulverulent, filler-containing rubber in the mixture.

2. Contrary to expectation, the replacement of impact-resistant styrene polymers by pulverulent, filler containing rubber does not lead to a lessening of the hot shape stability. Better measured impact-resistance is obtained (compare Examples 4 and 5 with Examples A in the Table, infra).

3. The addition of pulverulent, filler-containing rubber leads to increased measured impact-resistance (as seen by comparison of Examples 6 and 7 with Example D, see Table, infra).

In the context of the present invention, the term "thermoplastic compositions" should be understood to mean unmolded mixtures which can be processed into molded pieces or semi-finished products (e.g. molding blanks in the present context) by thermoplastic processing within a specified temperature range. These thermoplastic compositions may be in the form of, e.g., a granulate, a powder, or a sheet.

The types of polyphenylene ethers envisioned include polyphenylene ethers based on di-ortho-substituted phenols, wherein the ether oxygen of one unit is bound to the benzene nucleus of the next unit. It is envisioned that at least 50 such units will be linked together. Certain ortho positions to oxygen in the polyethers may be occupied by hydrogen, halogens, $C_1$ and $C_8$ hydrocarbons not having a tertiary carbon atom in the alpha position, halogenated $C_1$ to $C_8$ hydrocarbons, or phenyl. Some possible polyphenylene ethers include the following: poly(2,6-dichloro-1,4-phenylene) ether, poly(2,6-diphenyl-4-phenylene) ether, poly(2,6-dimethyl-1,4-phenylene ether, and poly(2,6-dibromo-1,4-phenylene ether. The preferred polyphenylene ether is poly(2,6-dimethyl-1,4-phenylene) ether, particularly with a viscosity of from 0.40 to 0.65 dl/g (measured in chloroform at 25° C.).

The polyphenylene ethers may be manufactured from the corresponding phenols, in the presence of, e.g., complex-forming agents, such as copper bromide and morpholine (see DE-OS Nos. 32 24 692 and 32 24 691).

The ordinary natural or synthetic rubbers customarily used as components of impact-resistant styrene polymers may be employed. In addition to natural rubber, suitable synthetic rubbers for the purpose include, e.g., polybutadiene, polyisoprene, and elastomeric mixed polymers of butadiene and/or isoprene with styrene and other comonomers. Other candidates include so-called ethylene-propylene rubbers (saturated or unsaturated) and butadiene-styrene block copolymers (two-block or three-block). In addition, mixtures of the preceding may be employed.

The impact-resistant styrene polymers are prepared by a method which is itself known. For example, the polymerization mixture may comprise a solution of rubber in styrene, with or without added solvents, or a solution of rubber in styrene in aqueous dispersion. Alternatively, the polymerization mixture may comprise the mixture employed in the so-called "mixed-process". In the "mixed process" the solution of rubber in styrene is pre-polymerized without added solvents and then the polymerization is completed in aqueous dispersion (see, e.g., U.S. Pat. Nos. 2,694,692 and 2,862,906).

The styrene may be replaced completely or partially by a styrene derivative wherein the nucleus or side chain is alkylated. Part of the styrene may be replaced by other comonomers, such as acrylic acid esters.

The impact-resistant styrene polymers employed may include mixtures of the abovementioned graft copolymers or mixtures of these with unmodified polystyrene.

In the pre-polymerization stage, the particle size in the soft phase is adjusted in a manner which is itself known, prior to the so-called "phase reversal". If necessary or desired, known chain regulators and/or radical initiators may be employed. Details of the procedures employed, e.g., the relationship between the stirring speed and the size and distribution of the rubber particles in the resulting impact-resistant polymer, are known to one skilled in the art (see, e.g., Freeguard, Brit. Polym. J., (1974) 6:203–228).

The diameter of the particles in the elastomeric gel phase according to the invention is ordinarily under 10 microns, preferably under 3.5 microns. The volumetric mean diameter is in the range of 1 to 5 micron. (In determining this means value, particles with diameter less than 0.5 microns or greater than 10 microns are disregarded.)

The volumetric mean particle size is determined by measuring and averaging the equivalent-circle diameters ("equivalent diameters") of the particles, using thin-layer electron micrographs. Then the distribution curve of the volumes of the particles is plotted (using the third power of the diameters), and the volumetric means is determined from this. At least 2,000 particles are taken into account in the evaluation.

The pulverulent, filler-containing rubber employed as a rule is of a type which remains fluid even after storage. The volumetric mean diameter of the particles should be less than 1 mm. On the other hand, the particles preferably should not be so small that dust is emitted during the mixing process. The Mooney viscosity of the polymer component of the pulverulent, filler-containing rubber for ML(1+4) at 100° C. may be between 40 and 120.

Within the scope of the invention, a synthetic rubber based on styrene and butadiene may be employed. This is preferably a rubber which is produced by polymerization in an emulsion and is known as "E-SBR rubber" for short. It is comprised of styrene 15–40% and butadiene 85–60%, by weight. The weight fraction of the pulverulent, filler containing rubber in the thermoplastic compositions is between 0.5 and 50 wt. %, preferably 5–10 wt. %.

There are a number of different processes for manufacturing the suitable types of rubber. However, many of the known processes are so time-consuming and complex that they have proven impracticable. Recently a suitable process has been implemented industrially. This process is described in DE-OS No. 28 22 148. It is distinguished by the fact that the rubber components are combined in dissolved form with an aqueous suspension comprising the fillers. The suspension comprises (in the aqueous phase) a water-soluble aluminum salt and water glass. It is crucial that the aqueous filler dispersion have a pH of from 3.0 to 3.7, and that when this dispersion is combined with the rubber components a mineral acid be added in an amount such that this pH range is maintained in the resulting mixture.

Possible fillers for the rubber include, in particular, silicates. Preferred fillers are silicic acid and carbon black (even though the latter is not a silicate). Also, mixtures of fillers are possible. It is recommended that silicic acid be hydrophobized, in order to facilitate its incorporation into the nonpolar polymer material. For other details, the reader is referred to DE-OS No. 28 22 148. The filler content of the suitable pulverulent, filler-containing SBR rubber materials is between 10 and 80 wt. %, preferably between 30 and 60 wt. %.

Preferred pulverulent, filler-containing rubbers are pulverulent, filler-containing rubbers prepared according to the process described in DE-OS No. 28 22 148.

The inventive thermoplastic compositions may contain additives in the form of fire retardants, pigments, other oligomers and polymers, anti-static agents, stabilizers, agents for improving processibility, and strengthening and reinforcing agents and materials. Strengtheners and reinforcers may be present in amounts up to 50%, fire retardants up to 15%, and the sum of all other additives up to 5% (by weight, based on the total weight of the molding composition).

Possible fire retardants include aromatic phosphorus compounds of general formula

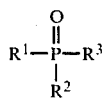

where $R^1$, $R^2$ and $R^3$, may be identical or different, and represent aryl, alkyl, cycloalkyl, alkyl-substituted aryl, halogen-substituted aryl, aryl-substituted alkyl, halogen, hydrogen; or, the aryloxy, alkyloxy, and cycloalkyloxy radicals corresponding to the preceding substituents, and combinations of these. At least one radical among $R^1$, $R^2$ and $R^3$ is an aryl or an aryloxy group, and the total number of carbon atoms in these three substituent groups is not more than 30. Examples an aryloxy group, and the total number of carbon atoms in these three substituent groups is not more than 30. Examples are triphenylphosphine oxide, phenyl didodecyl phosphate, phenyl di-neopentyl phosphate, phenyl vinyl hydrogen phosphate, phenyl-di-(3,5,5'-trimethylhexyl)-phosphate, ethyl-diphenylphosphate, 2-ethylhexyl-di-p-tolyl phosphate, diphenyl-hydrogen-phosphate, di-(2-ethylhexyl)-p-tolylphosphate, tritolyl phosphate, di-(2-ethylhexyl)phenyl phosphate, phenyl methyl hydrogen phosphate, di-(2-ethylhexyl)phenyl phosphate, phenyl methyl hydrogen phosphate, didodecyl p-tolyl phosphate, tricresyl phosphate, triphenyl phosphate, dibutyl phenyl phosphate, 2-chloroethyl diphenyl phosphate, p-tolyl di-(2,5,5'-trimethylhexyl)phosphate, 2-ethylhexyl diphenyl phosphate, and diphenyl hydrogen phosphate.

Particularly suitable fire retardants are phosphorus compounds in which each of the aforesaid $R^i$ ($i=1$, 2 or 3) substituents is an aryloxy or an aryl group; e.g., triphenyl phosphine oxide, and triphenyl phosphate.

An ordinary halogenated fire retardant may also be used. Possible such fire retardants include halogenated organic compounds such as described, e.g., in the monograph of H. Vogel (1966), "Fire Retardant Techniques for Plastics" (in German, "Flammfestmachen von Kunststoffen"), Pub. Huething-Verlag, pp. 94–102. Also, halogenated polymers, e.g. halogenated polyphenylene ethers (see DE-OS No. 33 34 068), or brominated oligomers or polymers of styrene. The compounds should contain more than 30 wt. % halogen.

If a halogenated fire retardant is used, it is recommended that a synergist be employed. Suitable synergists are compounds of antimony, boron, or zinc. These are added generally in amounts of from 5 to 10 wt. % (on the basis of the total).

Suitable reinforcing materials include, in particular, glass fibers and carbon fibers.

Suitable stabilizers include organic phosphates (e.g. didecyl phenyl phosphate and tri-lauryl phosphate), sterically hindered phenols, tetramethylpiperidine derivatives, benzophenone derivatives, and triazine derivatives.

Suitable agents for improving processibility include waxes, e.g. certain oxidized hydrocarbons.

The molding compositions are produced in standard fashion, on equipment which is compatible with a homogeneous mixture of the components, e.g. kneader-type mixers, mills, extruders, and roll-type mixers. In this process step the pulverulent, filler-containing rubber is dispersed in the polymer matrix. The preferred type of equipment is the continuous kneader-type mixer, e.g. the double-screw kneader mixer.

The molding compositions may be prepared directly from polyphenylene ethers, impact-resistant styrene polymers, and pulverulent, filler-containing rubber. Alternatively one may start with a mixture of, e.g., PPE and HISP mixed in the molten state, and then remelt this with other HISP and pulverulent, filler-containing rubber. This procedure has the advantage that it enables one to use a convenient method of preparing molten mixtures of PPE and HISP (see German Patent Application No. P 33 37 629.8, "Method of producing thermoplastic molding compositions containing polyphenylene ethers"; and DE-OS No. 31 31 440).

The compositions of this invention may be subjected to the customary forming and working processes for thermoplastics, e.g. extrusion and injection molding, to produce molded or formed pieces and semifinished products. The compositions are useful in, e.g., the automotive, electrical, and precision and specialty manufacturing sectors.

Other features of the invention will become apparent in the course of the following description of exemplary embodiments which are given for illustration of the invention and are not intended to be limiting thereof.

I. EXAMPLES OF PREPARATION OF THE COMPONENTS

Example 1.1

A polyphenylene ether with a reduced specific viscosity of 0.55 dl/g (determined in chloroform according to DIN 53 728) was prepared by oxidative coupling of 2,6-dimethylphenol, terminating the reaction, and subsequent reaction/extraction, in accordance with DE-OSs 33 13 864 and 33 32 377. A mixture of the polyphenylene ether and rubber-modified polystyrene (see Example 2.1, infra) in a weight ratio of 55:45 was prepared according to German Patent Application No. P 33 37 629.8.

Example 2.1

The impact-resistant styrene polymer (HISP) used was "Vestyron ® 616" of the firm Chemische Werke Huels AG, D-4370 Marl, West Germany. The technical data on this product are given in the brochure entitled "Plastics of Huels: Vestyron ®" in German, published September, 1979.

Example 3.1

A pulverulent natural rubber containing silicic acid in the amount of 31.5 wt. % was produced according to DE-OS No. 28 22 148.

Example 3.2

A pulverulent E-SBR rubber (based on styrene 23.5% and butadiene 76.5% by wt.) containing carbon black in the amount of 41% by weight of the total was produced according to DE-OS No. 28 22 148.

II. EXAMPLES OF THE PREPARATION AND TESTING OF THE POLYMER

Mixtures

All mixtures contained, per 100 parts by weight of PPE, HISP, and the following additives, PPE, HISP, and the following additives:

0.5 parts by weight di-decyl phenyl phosphate;

0.5 parts by weight octadecyl 3-(3,5-di-t-butyl-4-hydroxyphenyl)propionate; and
1.5 parts by weight Vestowax ® AO 1539.

"Vestowax ® AO 1539" is a product of Chemische Werke Huels AG, D-4370 Marl, West Germany. It is a wax with molecular weight 1,500, produced by oxidation of polyethylene.

The equipment used to produce the impact-resistant polymeric mixtures was a "ZSK 30" double screw kneader-mixer, supplied by the firm Werner und Pfleiderer, and having conveying, kneading, and degasification zones.

The components were mixed mechanically and re-melted in the mentioned equipment (the ZSK 30); a uniform cylinder-temperature of 230° C. and a screw revolution rate of 250 rpm were used. The exiting molten cords were granulated by the customary method. The granules were dried at 110° C. to a moisture content of less than 0.05%.

For the determination of the notched impact resistance according to DIN 53 453, the granulate was formed into specimen according to ISO 1 79 of 1982, notched type C, using an injection molding machine with a cylinder temperature of 240° to 260° C. and a mold temperature of 90° C.

The Vicat softening temperature according to DIN 53 460 was determined on pressed plates 4 mm thick which had been formed at 250° C.

TABLE

Impact resistance and hot shape stability of the polymer mixtures

| Ex. No. | Components employed, from Example Nos. | Weight ratio of PPE:HISP:rubber | Notched impact resistance according to DIN 53 453 (in mJ/mm:) | Vicat softening temperatures (°C.) according to DIN 53 460 A | B |
|---|---|---|---|---|---|
| 4 | 1.1 + 2.1 + 3.2 | 34/61/5 | 12.3 | 130 | 121 |
| 5 | 1.1 + 2.1 + 3.2 | 34/56/10 | 14.0 | 131 | 122 |
| A | 1.1 + 2.1 | 34/66/0 | 10.7 | 128 | 120 |
| B | 1.1 + 2.1 + 3.1 | 34/61/5 | 7.5 | 129 | 123 |
| C | 1.1 + 2.1 + 3.1 | 34/56/10 | 8.0 | 133 | 124 |
| 6 | 1.1 + 2.1 + 3.2 | 55/45/5 | 12.4 | 146 | 139 |
| 7 | 1.1 + 2.1 + 3.2 | 55/45/10 | 14.4 | 146 | 139 |
| D | 1.1 + 2.1 | 55/45/0 | 10.6 | 146 | 139 |

Obviously, numerous modifications and variations of the present invention are possible in light of the above teachings. It is therefore to be understood that within the scope of the amended claims, the invention may be practiced otherwise than as specifically described herein.

What is claimed as new and intended to be secured by Letters Patent is:

1. A thermoplastic molding composition comprising a polyphenylene ether, an impact-resistant styrene polymer and a pulverulent, filler-containing styrene-butadiene rubber, wherein the pulverulent, filler-containing rubber is prepared by (a) combining the rubber component in dissolved form with an aqueous suspension of a filler, wherein the suspension comprises a water-soluble aluminum salt and water glass, and has a pH of from 3.0 to 3.7, and (b) precipitating a pulverulent, filler containing rubber by adding mineral acid to the aqueous suspension mixture to maintain the pH at from 3.0 to 3.7.

2. The thermoplastic molding composition of claim 1 wherein the pulverulent, filler-containing rubber is based on emulsion polymerized SBR rubber.

3. The thermoplastic compositions of claim 1 wherein pulverulent, filler-containing SBR rubber is present in the thermoplastic composition in an amount of from 0.5 to 50 wt. %.

4. The thermoplastic composition of claim 1 wherein pulverulent, filler-containing SBR rubber is present in the thermoplastic composition in an amount of from 5 to 10 wt. %.

5. The thermoplastic composition of claim 1 wherein the rubber component of the pulverulent, filler-containing SBR rubber comprises from about 15 to 40 wt. % of polymerized styrene units, the remainder of the rubber component being comprised of polymerized butadiene units.

6. The thermoplastic composition of claim 1 wherein the rubber component of the pulverulent, filler-containing SBR rubber comprises from about 20 to 25 wt. % of polymerized styrene units, the remainder of the rubber component being comprised of polymerized butadiene units.

7. The thermoplastic composition of claim 1 wherein the filler material used with the pulverulent SBR rubber comprises carbon black.

8. The thermoplastic composition of claim 1 wherein the filler material used with the pulverulent SBR rubber comprises silicic acid.

9. The thermoplastic composition of claims 7 or 8, wherein the filler material content of the pulverulent, filler-containing SBR rubber employed is between 10 and 80 wt. %.

10. The thermoplastic composition of claims 7 or 8, wherein the filler material content of the pulverulent, filler-containing SBR rubber employed is between 30 and 60 wt. %.

11. The thermoplastic composition of claim 1, wherein the content of rubber in the impact-resistant styrene polymer is between 5 and 10 wt. %.

12. The thermoplastic composition of claim 1, wherein the diameter of the particles in the elastomeric gel phase of the impact-resistant styrene polymers employed is less than 10 micron.

13. The thermoplastic composition of claim 12, wherein the diameter of the particles is less than 3.5 micron.

14. The thermoplastic composition of claims 12 or 13, wherein the volumetric mean diameter of the particles having diameters between 0.5 micron and 10 micron is in the range between 1 and 5 micron.

15. The thermoplastic composition of claim 1, wherein up to 50 wt. % of the composition comprises reinforcing materials, and up to 15 wt. % of the composition comprises a fire retardant agent (wt. % is on the basis of the total weight of the molding composition).

16. The thermoplastic composition of claim 15, wherein up to 5 wt. % of the composition is comprised of additional additives (wt. % is on the basis of the total weight of the molding composition.)

17. The thermoplastic composition of claim 1, wherein the composition comprises additional additives.

18. A method for preparing the thermoplastic composition of claim 1, wherein the components are mixed thoroughly and are melted in a kneader-mixer.

19. A method for preparing the thermoplastic composition of claim 1, wherein the pulverulent, filler-containing rubber and the various additives are mixed into a melt comprised of polyphenylene ethers and impact-resistant styrene polymers, at a temperature of 200° to 300° C.

* * * * *